(12) United States Patent
Tanaka

(10) Patent No.: US 8,484,989 B2
(45) Date of Patent: Jul. 16, 2013

(54) REFRIGERATION SYSTEM HAVING AN ENERGY SAVING OPERATION

(75) Inventor: Shigeto Tanaka, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 1050 days.

(21) Appl. No.: 12/517,973

(22) PCT Filed: Sep. 26, 2008

(86) PCT No.: PCT/JP2008/002699
§ 371 (c)(1),
(2), (4) Date: Jun. 5, 2009

(87) PCT Pub. No.: WO2009/041068
PCT Pub. Date: Apr. 2, 2009

(65) Prior Publication Data
US 2010/0293977 A1    Nov. 25, 2010

(30) Foreign Application Priority Data
Sep. 28, 2007   (JP) .................................. 2007-255696

(51) Int. Cl.
F25D 17/00  (2006.01)
(52) U.S. Cl.
USPC ................ 62/180; 62/186; 62/226; 62/228.1; 62/229
(58) Field of Classification Search
USPC .......................... 62/180, 186, 226, 228.1, 229
See application file for complete search history.

(56) References Cited

U.S. PATENT DOCUMENTS

| 6,578,376 B2 * | 6/2003 | Thurman .................... 62/246 |
| 2003/0145614 A1 | 8/2003 | Tanaka |
| 2005/0138954 A1 * | 6/2005 | Kim et al. .................... 62/419 |
| 2009/0025410 A1 | 1/2009 | Tanaka et al. |

FOREIGN PATENT DOCUMENTS

| JP | 2001-174128 A | 6/2001 |
| JP | 2002-327964 A | 11/2002 |
| JP | 2003-194445 A | 7/2003 |
| JP | 2007-57221 A | 3/2007 |

OTHER PUBLICATIONS

JP 2007057221 A (English Translation).*

* cited by examiner

*Primary Examiner* — Cheryl J Tyler
*Assistant Examiner* — Jonathan Bradford
(74) *Attorney, Agent, or Firm* — Birch, Stewart, Kolasch & Birch, LLP.

(57) ABSTRACT

The refrigeration system has an energy saving operation mode performing: a first action in which a compressor (11) and an internal fan (16) are driven while the cooling capacity of an evaporator (14) is regulated; a second action in which, when the blow-off-side air temperature in a cold storage is kept at a set value in the first action, the cooling capacity of the evaporator (14) is increased to lower the blow-off-side air temperature to a lower limit temperature of a desired temperature range containing the set value and the compressor (11) and the internal fan (16) are then stopped; and a third action in which, when the blow-off-side air temperature after the second action rises to an upper limit temperature of the desired temperature range, the first action is restarted. Furthermore, the energy saving operation mode is configured so that when the suction-side air temperature in the cold storage after the second action rises to a limit value, the internal fan (16) is activated at a lower air flow rate than in the first action.

6 Claims, 8 Drawing Sheets

REFRIGERATION SYSTEM HAVING AN ENERGY SAVING OPERATION

TECHNICAL FIELD

This invention relates to refrigeration systems with a cooling heat exchanger for cooling the interior of a cold storage and particularly relates to methods for energy saving operation of the refrigeration systems.

BACKGROUND ART

Refrigeration systems are conventionally known for cooling the interior of a cold storage, such as a chiller or a freezer.

For example, Patent Document 1 discloses a refrigeration system for cooling the interior of a cold storage in a container for use in sea transport or other transports. This refrigeration system includes a refrigerant circuit in which a compressor, a condenser, an expansion valve and a cooling heat exchanger (an evaporator) are connected. The refrigerant circuit in the refrigeration system operates in a vapor compression refrigeration cycle by circulating refrigerant therethrough. Thus, the refrigerant flowing through the cooling heat exchanger takes heat from air in the cold storage to evaporate and thereby cool the air in the cold storage. The refrigeration system is capable of a freezing operation for freezing stored goods in the container by cooling the air in the cold storage with temperatures below zero degrees Celsius and a chilling operation for chilling stored goods in the container by cooling the air in the cold storage with temperatures above zero degrees Celsius.

Patent Document 1: Published Japanese Patent Application No. 2002-327964

DISCLOSURE OF THE INVENTION

Problem to be Solved by the Invention

For example, the above refrigeration system may be required to maintain the internal cold storage temperature with a high accuracy, for example, of about ±0.5° C., depending on stored goods in the container. Therefore, conventional refrigeration systems continuously drive their compressors because of the priority placed on ensuring the accuracy of the internal cold storage temperature. However, once the air in the cold storage of the container becomes cool, the cooling load on the cooling heat exchanger does not so drastically change. In addition, it is unlikely that the outside temperature acting on the cooling load changes so abruptly. Hence, in most cases, refrigeration systems can keep the internal cold storage temperature constant even with reduced cooling capacity of their cooling heat exchangers. Even in such cases, however, conventional refrigeration systems keep on driving their compressors and other components to consume energy uselessly.

The present invention has been made in view of the foregoing points and an object thereof is that the refrigeration system for cooling the interior of a cold storage with a cooling heat exchanger has the ability to provide an operation excellent in energy saving performance while keeping the internal cold storage temperature within a desired temperature range.

Means to Solve the Problem

The present invention reduces the energy consumption of the entire refrigeration system by utilizing cold heat accumulated in stored goods and the like in the cold storage as much as possible.

Specifically, a first aspect of the invention is directed to a refrigeration system including: a refrigerant circuit (10) including a compressor (11) and a cooling heat exchanger (14) both connected therein, the refrigerant circuit (10) operating in a refrigeration cycle by circulating refrigerant therethrough; and an internal fan (16) for sucking in air from the interior of a cold storage to allow the air to flow through the cooling heat exchanger (14) and then blowing off the air into the cold storage. Furthermore, the refrigeration system further includes a capacity regulator (35) for regulating the cooling capacity of the cooling heat exchanger (14) to keep the blow-off-side air temperature in the cold storage at a set value. Moreover, the refrigeration system is configured to be capable of performing an energy saving operation including: a first action in which the compressor (11) and the internal fan (16) are driven while the capacity regulator (35) regulates the cooling capacity of the cooling heat exchanger (14); a second action in which, when the blow-off-side air temperature is kept at the set value in the first action, the capacity regulator (35) increases the cooling capacity of the cooling heat exchanger (14) to lower the blow-off-side air temperature to a lower limit of a desired temperature range containing the set value, and then the compressor (11) and the internal fan (16) are stopped; and a third action in which, when the blow-off-side air temperature after the second action rises to an upper limit of the desired temperature range, the first action is restarted.

In this aspect of the invention, refrigerant circulates through the refrigerant circuit (10), whereby the refrigerant circuit (10) operates in a vapor compression refrigeration cycle. Meanwhile, air in the cold storage is sucked in and fed to the cooling heat exchanger (14) by the internal fan (16). As a result, in the cooling heat exchanger (14), the refrigerant takes heat from the air to evaporate, thereby cooling the air. The cooled air is blown off into the cold storage to cool the interior of the cold storage.

The refrigeration system according to this aspect of the invention can perform an energy saving operation of intermittently driving the compressor (11) and the internal fan (16). Specifically, in the energy saving operation, the following first to third actions are repeated. Furthermore, in this case, the refrigeration system determines a set value of the blow-off-side air temperature in the cold storage (i.e., the air temperature near to an air outlet in the cold storage) and upper and lower limits of a desired temperature range (allowable temperature range) containing the set value.

First, in the first action, the compressor (11) and the internal fan (16) are driven and the capacity regulator (35) regulates the cooling capacity of the cooling heat exchanger (14). Thus, the blow-off-side air temperature gradually approaches the set value. Note that in the first action the blow-off-side air temperature corresponds to the temperature of air that is cooled by the cooling heat exchanger (14) and blown off into the cold storage. Then, when the blow-off-side air temperature is kept at the set value, the second action is carried out. In the cold storage, the region near to the air outlet is the lowest temperature region. However, since the blow-off-side air temperature is controlled, this surely prevents the stored goods from being excessively cooled (such as frozen).

In the second action, the compressor (11) and the internal fan (16) are still continuously driven, while the capacity regulator (35) increases the cooling capacity of the cooling heat exchanger (14). Thus, the blow-off-side air temperature gradually decreases. Then, when the blow-off-side air temperature reaches the lower limit of the desired temperature range, the compressor (11) and the internal fan (16) are stopped. Thus, the refrigerant circuit (10) does not operate in a refrigeration cycle and the air in the cold storage is not fed to the cooling heat exchanger (14). In other words, the cooling of the interior of the cold storage is substantially stopped. As a result, the internal cold storage temperature gradually rises.

However, in this aspect of the invention, the rise in the internal cold storage temperature is hindered by cold heat accumulated in the cold storage itself and the stored goods. Specifically, since the interior of the cold storage has been cooled by the first action, cold heat is accumulated in the cold storage itself and the stored goods. The cold heat is used to hinder the rise in the internal cold storage temperature. In addition, since the blow-off-side air temperature is lowered to the lower limit of the desired temperature range, the amount of cold heat accumulated in the stored goods and the like is accordingly increased. This further hinders the rise in the internal cold storage temperature. Furthermore, since the internal fan (16) is stopped, there is no heat produced by driving the internal fan (16). This also hinders the rise in the internal cold storage temperature. Thereafter, when the blow-off-side air temperature gradually rises and reaches the upper limit of the desired temperature range, the third action is carried out. Specifically, the first action is restarted with the restart of the compressor (11) and the internal fan (16). When the first action is restarted, the blow-off-side air temperature gradually approaches the set value again.

A second aspect of the invention is the refrigeration system according to the first aspect of the invention, wherein the energy saving operation is configured so that when the suction-side air temperature in the cold storage after the second action rises to a predetermined limit value, the internal fan (16) is activated at a lower air flow rate than in the first action.

In this aspect of the invention, when the compressor (11) and the internal fan (16) are stopped by the second action, the internal cold storage temperature gradually rises. Specifically, the blow-off-side air temperature and the suction-side air temperature (i.e., the air temperature near to an air inlet in the cold storage) gradually rise. In the cold storage, upper air is higher in temperature than lower air. The refrigeration system sucks in warm air and cools it. Therefore, generally, the air inlet is formed in an upper part of the cold storage and the air outlet is formed in a lower part of the cold storage. Therefore, the suction-side air temperature is the highest temperature in the cold storage. Then, when the suction-side air temperature rises to the predetermined limit value, the internal fan (16) is activated. Thus, the air in the cold storage is fed to the cooling heat exchanger (14) and then blown off into the cold storage again. As a result, the air in the cold storage is agitated to even out the internal cold storage temperature. Therefore, an accurate blow-off-side air temperature is detected.

Furthermore, in order to agitate the air in the cold storage, there is no need to drive the internal fan (16) at a very high air flow rate but it suffices to drive the internal fan (16) at a lower air flow rate than in the first action. Therefore, the amount of heat produced by driving the internal fan (16) is not so large. Moreover, the air sucked in by the internal fan (16) is fed to the cooling heat exchanger (14) and cooled in some degree by cold heat accumulated in the cooling heat exchanger (14). Thus, the interior of the cold storage is cooled in some degree.

A third aspect of the invention is the refrigeration system according to the second aspect of the invention, wherein the energy saving operation is configured so that the limit value of the suction-side air temperature is set at a fixed amount higher value than the suction-side air temperature at the end of the first action.

In this aspect of the invention, when, by the first action, the blow-off-side air temperature is kept at the set value and the suction-side air temperature is kept at a constant value, the second action is carried out. In this case, the limit value of the suction-side air temperature is set at a fixed amount ($\alpha°$ C.) higher value than the suction-side air temperature at the end of the first action. Specifically, the limit value of the suction-side air temperature is not set in advance but set based on the suction-side air temperature meeting the actual cooling load obtained by the normal operation.

A fourth aspect of the invention is the refrigeration system according to the first aspect of the invention, wherein the energy saving operation is configured so that, after the second action, the internal fan (16) is intermittently driven at a lower air flow rate than in the first action.

In this aspect of the invention, after the compressor (11) and the internal fan (16) are stopped by the second action, only the internal fan (16) is intermittently driven. Thus, the air in the cold storage is intermittently agitated. Therefore, after the second action, the internal cold storage temperature is evened out, which enables detection of accurate blow-off-side air temperature and suction-side air temperature. In addition, since the intermittent operation of the internal fan (16) is carried out at a low air flow rate, the amount of heat produced by the internal fan (16) is not so large. Hence, since in this manner the air in the cold storage is regularly agitated after the second action, this increases the uniformity of the internal cold storage temperature.

A fifth aspect of the invention is the refrigeration system according to the first aspect of the invention, wherein the energy saving operation is configured so that when a predetermined period of time has passed after the second action before the start of the third action, the internal fan (16) is activated at a lower air flow rate than in the first action.

In this aspect of the invention, when the predetermined period of time has passed since the compressor (11) and the internal fan (16) were stopped by the second action, the internal fan (16) is activated at a low air flow rate. In other words, when the internal fan (16) has been stopped for the predetermined period of time before the start of the third action, the internal fan (16) is activated. As a result, the air in the cold storage is agitated to even out the internal cold storage temperature. Furthermore, since the internal fan (16) is driven at a lower air flow rate than in the first action, the amount of heat produced by driving the internal fan (16) is not so large.

A sixth aspect of the invention is the refrigeration system according to the first aspect of the invention, wherein the energy saving operation is configured so that the set value of the blow-off-side air temperature is lowered in every predetermined period of time.

In this aspect of the invention, during the energy saving operation, the set value of the blow-off-side air temperature is changed in every predetermined operating period of time. Specifically, when one hour, for example, has passed since the start of the energy saving operation, the set value of the blow-off-side air temperature is lowered by a fixed amount. Subsequently, when another hour has passed, the set value of the blow-off-side air temperature is lowered by another fixed amount. In this manner, during the energy saving operation, the set value of the blow-off-side air temperature is stepwise lowered. Note that the lowering of the set value is made within a temperature range in which the stored goods are not affected.

As the energy saving operation of intermittently driving the compressor (11) and the internal fan (16) is carried out long, the amount of cold heat accumulated in the stored goods and the like gradually decreases. To cope with this, in this aspect of the invention, the set value of the blow-off-side air temperature is lowered in every predetermined operating period of time as described above. Therefore, the internal cold storage temperature to be kept by the first action is also gradually lowered. Thus, the amount of cold heat accumulated in the stored goods and the like by the first action increases according to the operating period of time. This hinders the decrease in the amount of cold heat accumulated in the stored goods and the like. Hence, even if the energy saving operation is performed for a long time, the rise in the internal cold storage temperature after the second action is surely hindered.

A seventh aspect of the invention is the refrigeration system according to the first aspect of the invention, wherein the energy saving operation is configured so that the operating period of time of the first action is forcedly extended in every predetermined period of time.

In this aspect of the invention, the operating period of time of the first action is extended in every predetermined operating period of time. In other words, even if the blow-off-side air temperature is kept at the set value in the first action, the first action is continued until a predetermined period of time has passed. Thus, the amount of cold heat accumulated in the stored goods and the like by the first action increases according to the operating period of time. This hinders the decrease in the amount of cold heat accumulated in the stored goods and the like. Hence, even if the energy saving operation is performed for a long time, the rise in the internal cold storage temperature after the second action is surely hindered.

An eighth aspect of the invention is the refrigeration system according to the first aspect of the invention, wherein the energy saving operation is configured so that when the blow-off-side air temperature after the second action falls below the lower limit of the desired temperature range, the internal fan (16) is activated.

In this aspect of the invention, if the blow-off-side air temperature after the second action falls below the lower limit of the desired temperature range, the internal fan (16) is driven. Thus, the internal fan (16) produces heat to raise the internal cold storage temperature. Therefore, the blow-off-side air temperature falls within the desired temperature range.

A ninth aspect of the invention is the refrigeration system according to any one of the first to eighth aspects of the invention, wherein the capacity regulator comprises a flow regulator valve (35), connected in the refrigerant circuit (10), for regulating the amount of flow of refrigerant sucked into the compressor (11). Furthermore, the energy saving operation is configured so that, upon the second action, the opening of the flow regulator valve (35) is increased to increase the cooling capacity of the cooling heat exchanger (14).

In this aspect of the invention, a flow regulator valve (35) is connected in the refrigerant circuit (10). The flow regulator valve (35) constitutes a capacity regulator for regulating the cooling capacity of the cooling heat exchanger (14) by regulating the amount of flow of refrigerant to be sucked into the compressor (11).

Specifically, in the first action, the opening of the flow regulator valve (35) is regulated, whereby the refrigerant circulation amount in the refrigerant circuit (10) is regulated. In this case, when the refrigerant circulation amount is regulated by throttling the opening of the flow regulator valve (35), the refrigerant is on the wet side over substantially the entire area of the cooling heat exchanger (14) serving as an evaporator. If the cooling capacity of the evaporator were regulated by regulating the opening of the expansion valve on the inflow side of the evaporator, refrigerant flowing through the evaporator would be on the dry side and would be likely to cause temperature variations from inflow end to outflow end of the evaporator. On the other hand, when the cooling capacity of the cooling heat exchanger (14) is regulated while the opening of the flow regulator valve (35) is throttled as in this aspect of the invention, this uniformizes the temperature distribution of refrigerant from inflow end to outflow end of the cooling heat exchanger (14). As a result, the air in the cold storage is cooled to a relatively uniform temperature by the cooling heat exchanger (14).

When the blow-off-side air temperature is kept at the set value by the above regulation of the opening of the flow regulator valve (35) in the first action, the second action is carried out. In the second action, since the opening of the flow regulator valve (35) is regulated to a larger degree than in the first action, the refrigerant circulation amount in the refrigerant circuit (10) is increased to increase the cooling capacity of the cooling heat exchanger (14). Then, when the blow-off-side air temperature reaches the lower limit of the desired temperature range, the compressor (11) and the internal fan (16) are stopped.

Effects of the Invention

As described above, the present invention is capable of operating in an energy saving operation mode in which the compressor (11) and the internal fan (16) are intermittently driven. Therefore, for the stop period of time of the compressor (11) and the internal fan (16), the refrigerant circuit (10) does not operate in a refrigeration cycle but the rise in the internal cold storage temperature can be hindered (slowed down) by utilizing cold heat accumulated in stored goods and the like. In addition, since the internal fan (16) is stopped, this prevents heat from being produced from the internal fan (16) and thereby further hinders the rise in the internal cold storage temperature. Thus, the stop period of time of the compressor (11) and the internal fan (16) can be extended, which significantly reduces the operating power for the compressor (11) and the internal fan (16). As a result, the energy saving performance of the refrigeration system (1) can be significantly enhanced.

Particularly in this aspect of the invention, the blow-off-side air temperature is once lowered to the lower limit temperature by the second action and the compressor (11) and the internal fan (16) are then stopped. Therefore, the amount of cold heat accumulated in the stored goods and the like can be increased. This surely extends the stop period of time of the compressor (11) and the internal fan (16) and thereby further enhances the energy saving performance.

Furthermore, in the second aspect of the invention, when the suction-side air temperature in the cold storage rises to the limit value during stop of the compressor (11) and the internal fan (16), the internal fan (16) is activated at a lower air flow rate than in the first action. Therefore, the internal cold storage temperature can be evened out and the highest internal cold storage temperature, i.e., the blow-off-side air temperature, can be accurately detected. As a result, the start timing of the third action can be accurately determined. This increases the reliability of control over the internal cold storage temperature.

In addition, since in this aspect of the invention the internal fan (16) is driven at a lower air flow rate than in the first action, the amount of heat produced by the internal fan (16) can be reduced as much as possible. Hence, the reliability of control over the internal cold storage temperature can be increased without reducing the period of time from the second action to the third action so much.

In the third aspect of the invention, the limit value of the suction-side air temperature is set at a fixed amount higher value than the suction-side air temperature at the end of the first action. Thus, the limit value of the suction-side air temperature can be set at an appropriate value to the actual cooling load. Therefore, the activation timing of the internal fan (16) can be appropriately determined within the period of time from the second action to the start of the third action, which enhances the controllability over the internal cold storage temperature. As a result, the energy saving performance of the refrigeration system (1) can be surely enhanced.

In the fourth aspect of the invention, after the second action, only the internal fan (16) is intermittently driven at a low air flow rate. Thus, the internal cold storage temperature can be approximately evened out over the stop period of time of the compressor (11). Therefore, the highest internal cold storage temperature can be accurately detected even during the stop of the compressor (11). As a result, the start timing of the third action can be appropriately determined. Furthermore, since the internal fan (16) is intermittently driven at a low air flow rate, the amount of heat produced by the internal fan (16) can be significantly reduced as compared with the case where the internal fan (16) is continuously driven. Therefore, the heat from the internal fan (16) does not contribute to the rise in the internal cold storage temperature so much, which extends the period of time from the second action to the start of the third action and thereby enhances the energy saving performance.

In the fifth aspect of the invention, when the predetermined period of time has passed since the compressor (11) and the internal fan (16) were stopped by the second action, the internal fan (16) is activated at a low air flow rate. In other words, in this aspect of the invention, the stop period of time of the internal fan (16) after the second action is set in advance. Therefore, during the stop of the compressor (11), the internal fan (16) can be forcedly activated at a low air flow rate regardless of the suction-side air temperature. This eliminates the need for any operation for setting the limit value of the suction-side air temperature and any operation for detecting the suction-side air temperature, thereby simplifying the control structure.

In the sixth aspect of the invention, each time when a predetermined operating period of time of the energy saving operation has passed, the set value of the blow-off-side air temperature is lowered. Thus, as the operating period of time increases, the capacity to cool the interior of the cold storage through the first action can be increased. In other words, the amount of cold heat accumulated in the stored goods and the like through the first action can be increased. Specifically, since in the energy saving operation mode the compressor (11) and the internal fan (16) are intermittently driven, the amount of cold heat accumulated in the stored goods and the like gradually decreases as the operating period of time increases. However, according to this aspect of the invention, the decrease in the amount of cold heat accumulated can be hindered, whereby a sufficient amount of cold heat accumulated can be secured. Thus, the effect of accumulating cold heat in the stored goods and the like can be obtained for a long time. This hinders the stop period of time of the compressor (11) and the internal fan (16) from being shortened and thereby surely enhances the energy saving performance.

In the seventh aspect of the invention, each time when a predetermined operating period of time of the energy saving operation has passed, the operating period of time of the first action is forcedly extended. Thus, like the sixth aspect of the invention, as the operating period of time increases, the capacity to cool the interior of the cold storage through the first action can be increased. Therefore, even if the energy saving operation is performed for a long time, a sufficient amount of cold heat accumulated in the stored goods and the like can be secured and the effect of accumulating cold heat can be effectively exhibited. This hinders the stop period of time of the compressor (11) and the internal fan (16) from being shortened and thereby surely enhances the energy saving performance.

In the eighth aspect of the invention, if the blow-off-side air temperature after the second action falls below the lower limit of the desired temperature range, the internal fan (16) is activated. Therefore, it can be prevented that the blow-off-side air temperature (internal cold storage temperature) is excessively lowered beyond the desired temperature range by heat production of the internal fan (16). This increases the reliability of control over the internal cold storage temperature.

In the ninth aspect of the invention, the cooling capacity of the cooling heat exchanger (14) is regulated by regulating the amount of flow of refrigerant to be sucked into the compressor (11) with the flow regulator valve (35). Therefore, refrigerant on the wet side is accumulated in the entire area of the cooling heat exchanger (14), which evens out the temperature of air having passed through the cooling heat exchanger (14). In other words, if the cooling capacity of the cooling heat exchanger (14) is regulated by the flow regulator valve (35) as in this aspect of the invention, the controllability over the internal cold storage temperature can be enhanced. As a result, in the first action, the internal cold storage temperature can be promptly and surely brought close to the set value. Furthermore, since during the second action the compressor (11) can be surely stopped at the time when the internal cold storage temperature reaches the lower limit, it can be avoided that during the subsequent third action the internal cold storage temperature falls below the lower limit.

Furthermore, if upon the second action the cooling capacity of the cooling heat exchanger were increased by increasing the operating capacity (for example, operating frequency) of the compressor, the power consumption would also increase. Unlike this, in this aspect of the invention, the cooling capacity of the cooling heat exchanger is increased simply by regulating the opening of the flow regulator valve (35) to a larger degree than before. Therefore, the cooling capacity of the cooling heat exchanger (14) can be increased without incurring an increase in the power consumption.

Figure 1:
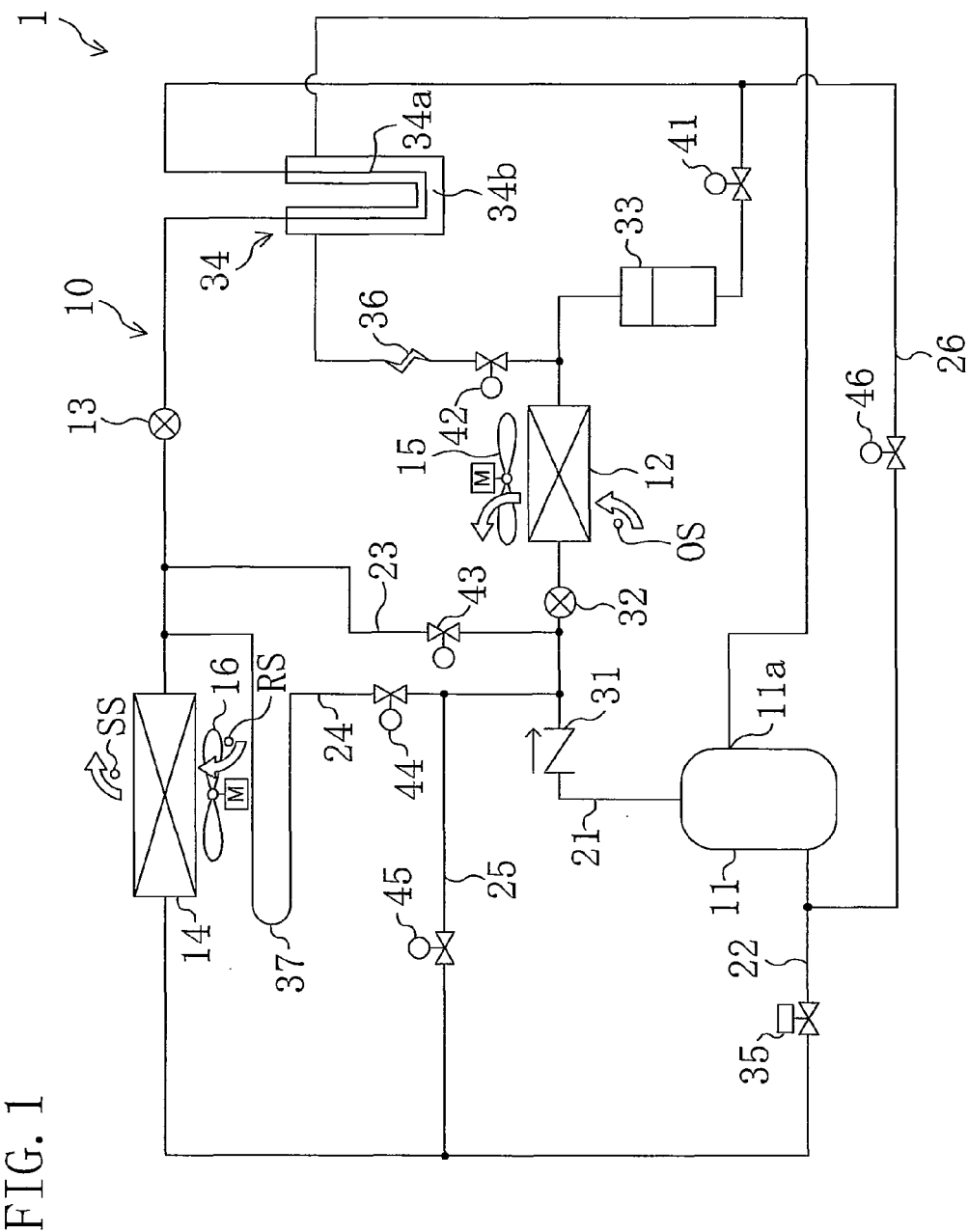
FIG. 1 is a piping diagram showing a general configuration of a refrigeration system according to an embodiment.

LIST OF REFERENCE NUMERALS 1 refrigeration system
10 refrigerant circuit 11 compressor
14 evaporator (cooling heat exchanger)
16 internal fan
35 suction proportional valve (capacity regulator, flow regulator valve)

BEST MODE FOR CARRYING OUT THE INVENTION

Embodiments of the present invention will be described below in detail with reference to the drawings. The following embodiments are merely preferred embodiments in nature and are not intended to limit the scope, applications and use of the invention.

Embodiment 1

A description is given of Embodiment 1 of the present invention. As shown in FIG. 1, a refrigeration system (1) according to this embodiment is used for the purpose of cooling the interior of a cold storage in a container for use in sea transport or other transports. The refrigeration system (1) includes: a refrigerant circuit (10) operating in a vapor compression refrigeration cycle by circulating refrigerant therethrough; an external fan (15); and an internal fan (16).

The refrigerant circuit (10) includes, as main components, a compressor (11), a condenser (12), an expansion valve (13) and an evaporator (14) all connected therein.

The compressor (11) is composed of a fixed displacement scroll compressor whose motor has a constant rotational speed.

The condenser (12) is placed outside the cold storage and constitutes a so-called air-cooled condenser. Disposed near to the condenser (12) is the external fan (15). The external fan (15) feeds external air (outside air) to the condenser (12). The condenser (12) provides heat exchange between refrigerant therein and outside air fed thereto by the external fan (15). Disposed near to the condenser (12) is also an outside temperature sensor (OS). The outside temperature sensor (OS) detects the temperature of the external air to be fed to the condenser (12).

The expansion valve (13) is composed of an electronic expansion valve regulatable in opening. The opening of the expansion valve (13) is regulated according to the degree of superheat of refrigerant flowing out of the evaporator (14).

The evaporator (14) is placed in the cold storage in the container and constitutes a cooling heat exchanger for cooling the interior of the cold storage. Disposed near to the evaporator (14) is the internal fan (16). The internal fan (16) sucks in air in the cold storage through an air inlet formed in the cold storage to allow the air to flow through the evaporator (14), and then blows off the air through an air outlet formed in the cold storage into the cold storage. The evaporator (14) provides heat exchange between refrigerant therein and air in the cold storage fed thereto by the internal fan (16). Although not shown, the air inlet for the air in the cold storage is formed in an upper part of the cold storage, while the air outlet for the same is formed in a lower part of the cold storage. In other words, the refrigeration system (1) according to this embodiment is of so-called underblow type.

Disposed near to the evaporator (14) are also two temperature sensors. Specifically, a suction temperature sensor (RS) is disposed near to the evaporator (14) towards the air inlet and a blowoff temperature sensor (SS) is disposed near to the evaporator (14) towards the air outlet. The suction temperature sensor (RS) detects the temperature of the air in the cold storage to be fed to the evaporator (14) (suction-side air temperature in the present invention). The blowoff temperature sensor (SS) detects the temperature of the air in the cold storage having passed through the evaporator (14) (blow-off-side air temperature in the present invention).

A discharge pipe (21) of the compressor (11) is connected via a check valve (31) and a discharge pressure regulating valve (32) in this order to the inflow end of the condenser (12). The outflow end of the condenser (12) is connected via a receiver (33), a first solenoid valve (41) and a high-pressure channel (34a) of an economizer heat exchanger (34) in this order to the expansion valve (13). A suction pipe (22) of the compressor (11) is connected via a suction proportional valve (35) to the outflow end of the evaporator (14). The inflow end of the evaporator (14) is connected to the expansion valve (13).

The economizer heat exchanger (34) provides heat exchange between refrigerant flowing through the above-mentioned high-pressure channel (34a) and refrigerant flowing through a low-pressure channel (34b) thereof. The inflow end of the low-pressure channel (34b) is connected via a capillary tube (36) and a second solenoid valve (42) in this order to the piping between the condenser (12) and the receiver (33). The outflow end of the low-pressure channel (34b) is connected to an intermediate suction port (11a) of the compressor (11). The intermediate suction port (11a) opens at a midpoint of a path along which refrigerant is compressed in the compression mechanism of the compressor (11).

The suction proportional valve (35) constitutes a flow regulator valve for regulating the refrigerant circulation amount in the refrigerant circuit (10) by regulating the amount of refrigerant to be sucked into the compressor (11). In other words, the suction proportional valve (35) constitutes a capacity regulator for regulating the cooling capacity of the evaporator (14) by regulating the refrigerant circulation amount. The opening of the suction proportional valve (35) is regulated according to the detected temperature of an unshown internal cold storage temperature sensor disposed in the interior of the cold storage in the container.

The refrigerant circuit (10) further includes a first defrosting pipe (23), a second defrosting pipe (24), a discharge gas bypass pipe (25) and a liquid injection pipe (26) all of which are connected therein.

The first defrosting pipe (23) and the second defrosting pipe (24) are pipes for a defrosting operation of feeding refrigerant discharged by the compressor (11) to the evaporator (14) to melt frost adhering to the evaporator (14). The first defrosting pipe (23) and the second defrosting pipe (24) are connected at their one ends to the piping between the check valve (31) and the discharge pressure regulating valve (32) and connected at their other ends to the piping between the expansion valve (13) and the evaporator (14). The first defrosting pipe (23) is provided with a third solenoid valve (43) that is opened throughout a defrosting operation. The second defrosting pipe (24) is provided with a fourth solenoid valve (44) that is opened throughout the defrosting operation, and a drain pan heater (37). The drain pan heater (37) is disposed in a drain pan for receiving frost and dew condensation water dropped off from the surface of the evaporator (14) in the cold storage of the container. Therefore, when refrigerant discharged by the compressor (11) flows through the drain pan heater (37) in the defrosting operation, frost and ice blocks of dew condensation water recovered in the drain pan take heat from the refrigerant discharged by the compressor (11) and thereby melt. In the defrosting operation, the discharge pressure regulating valve (32) is set to a fully closed position.

The discharge gas bypass pipe (25) is a pipe for diverting the refrigerant discharged by the compressor (11) from the condenser (12) and the evaporator (14) and returning it to the suction side of the compressor (11), such as when the cooling capacity of the evaporator (14) is excessive. The discharge gas bypass pipe (25) serves also as an oil return pipe for returning refrigerating machine oil in the refrigerant discharged from the compressor (11) to the suction side of the compressor (11). The discharge gas bypass pipe (25) is connected at one end to the piping between the check valve (31) and the fourth solenoid valve (44) and connected at the other end to the piping between the evaporator (14) and the suction proportional valve (35). The discharge gas bypass pipe (25) is provided with a fifth solenoid valve (45) that is appropriately opened according to operating conditions.

The liquid injection pipe (26) is a pipe for returning liquid refrigerant obtained by condensation in the condenser (12) to the suction side of the compressor (11), that is, for so-called liquid injection. The liquid injection pipe (26) is connected at one end to the piping between the first solenoid valve (41) and the economizer heat exchanger (34) and connected at the other end to the piping between the suction proportional valve (35) and the compressor (11). The liquid injection pipe (26) is provided with a sixth solenoid valve (46) that is appropriately opened according to operating conditions.

The refrigeration system (1) is provided with an unshown controller. In the controller, a set value is input for the detected value of the blowoff temperature sensor (SS) (hereinafter, referred to as blow-off-side air temperature). Furthermore, in the controller, an upper limit temperature (upper limit) and a lower limit temperature (lower limit) are set as a desired range of blow-off-side air temperatures in an energy saving operation mode whose details will be described later. Moreover, in the controller, a limit value is also input for the detected value of the suction temperature sensor (RS) (hereinafter, referred to as suction-side air temperature).

—Operational Action—

The refrigeration system (1) is switchable between a freezing operation for freezing stored goods in the cold storage of the container by cooling the internal cold storage temperature below zero degrees Celsius, a chilling operation (chilled operation) for chilling stored goods in the cold storage by cooling the internal cold storage temperature with higher temperatures than zero degrees Celsius and the above-mentioned defrosting operation. Now, a description is given of the chilling operation which is a feature of the present invention.

In the chilling operation, the refrigeration system can operate in a "normal operation mode" or an "energy saving operation mode". The normal operation mode is an operation mode in which the compressor (11) and the internal fan (16) are continuously driven and the air in the cold storage is continuously cooled by the evaporator (14) to chill stored goods in the cold storage. On the other hand, the energy saving operation mode is an operation mode in which the compressor (11) and the internal fan (16) are intermittently driven and the air in the cold storage is semi-continuously cooled by the evaporator (14) to chill stored goods in the cold storage while saving energy of the refrigeration system (1).

<Normal Operation Mode>

Figure 2:
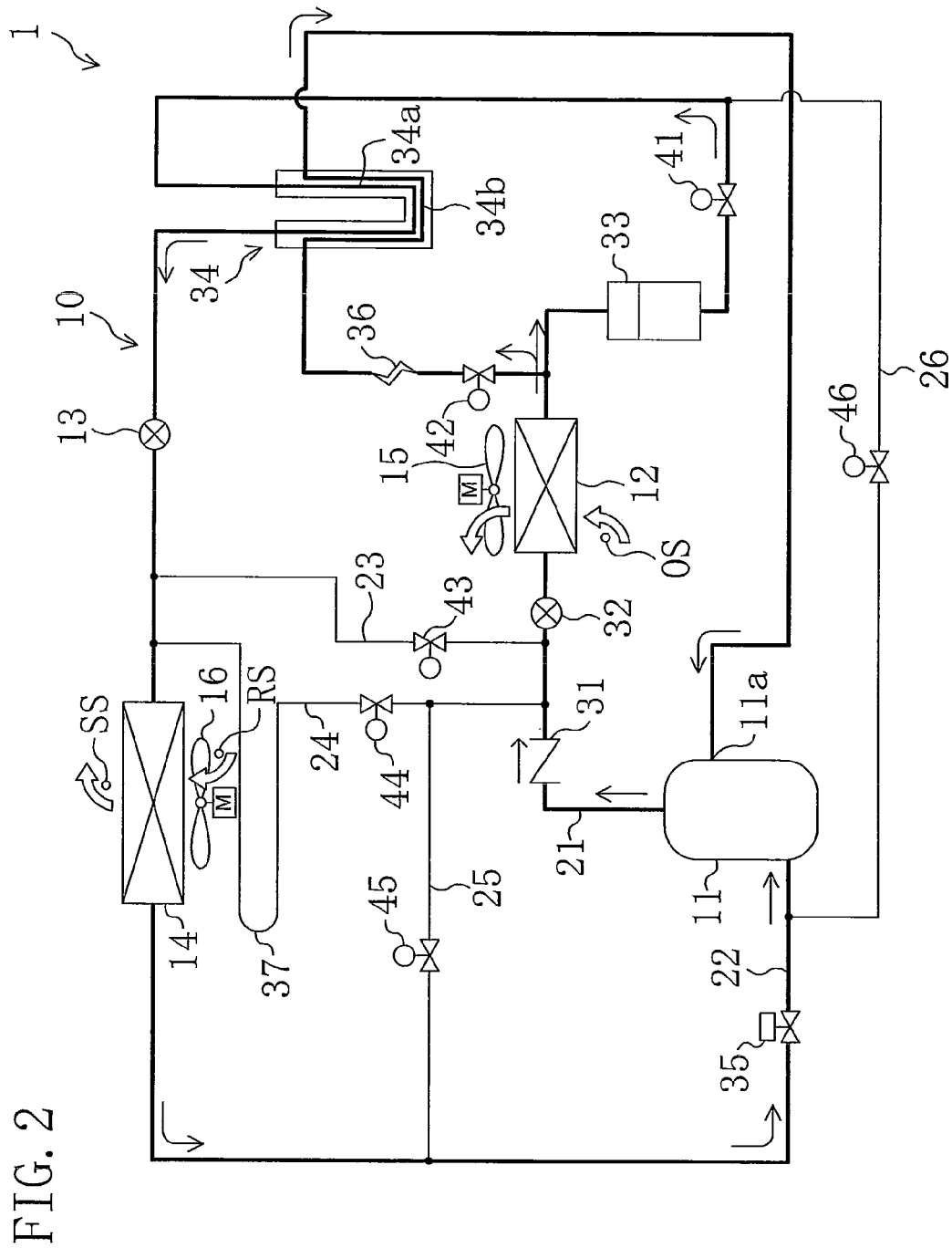
FIG. 2 is a piping diagram showing the refrigerant flow in the refrigeration system according to the embodiment when the refrigeration system is in operation.

First, a description is given of the normal operation mode of the refrigeration system (1) with reference to FIG. 2. In the normal operation mode, the compressor (11), the internal fan (16) and the external fan (15) are continuously driven and the openings of the expansion valve (13) and the suction proportional valve (35) are appropriately regulated. Furthermore, in the normal operation mode, the first solenoid valve (41) and the second solenoid valve (42) are in principle opened, while the third to sixth solenoid valves (43, 44, 45, 46) are in principle closed. The external fan (15) and the internal fan (16) are driven at their normal air flow rates (normal rotational speeds).

The refrigerant compressed by the compressor (11) flows through the discharge pipe (21) and then into the condenser (12). In the condenser (12), the refrigerant releases heat to the external air to condense. Thereafter, part of the refrigerant flows via the receiver (33) into the high-pressure channel (34a) of the economizer heat exchanger (34), while the rest is reduced in pressure in the course of passage through the capillary tube (36) and then flows into the low-pressure channel (34b) of the economizer heat exchanger (34).

In the economizer heat exchanger (34), the refrigerant flowing through the low-pressure channel (34b) takes heat from the refrigerant flowing through the high-pressure channel (34a) to evaporate. In other words, the economizer heat exchanger (34) supercools the refrigerant flowing through the high-pressure channel (34a). The refrigerant evaporated in the low-pressure channel (34b) is sucked through the intermediate suction port (11a) into the compressor (11).

The refrigerant supercooled in the high-pressure channel (34a) is reduced in pressure upon passage through the expansion valve (13) and then flows into the evaporator (14). Meanwhile, the air in the cold storage is sucked in through the air inlet and fed to the evaporator (14) by the internal fan (16). In the evaporator (14), the refrigerant takes heat from the air to cool the air. The cooled air is blown off through the air outlet into the cold storage. As a result, the interior of the cold storage in the container is cooled. The refrigerant evaporated in the evaporator (14) passes through the suction proportional valve (35) and is then sucked into the compressor (11).

In the normal operation mode, the controller regulates the opening of the suction proportional valve (35) to keep the blow-off-side air temperature at the set value. In other words, the controller controls the cooling capacity of the evaporator (14) by regulating the opening of the suction proportional valve (35). According to this control, the blow-off-side air temperature is kept at the set value.

<Energy Saving Operation Mode>

Figure 3:
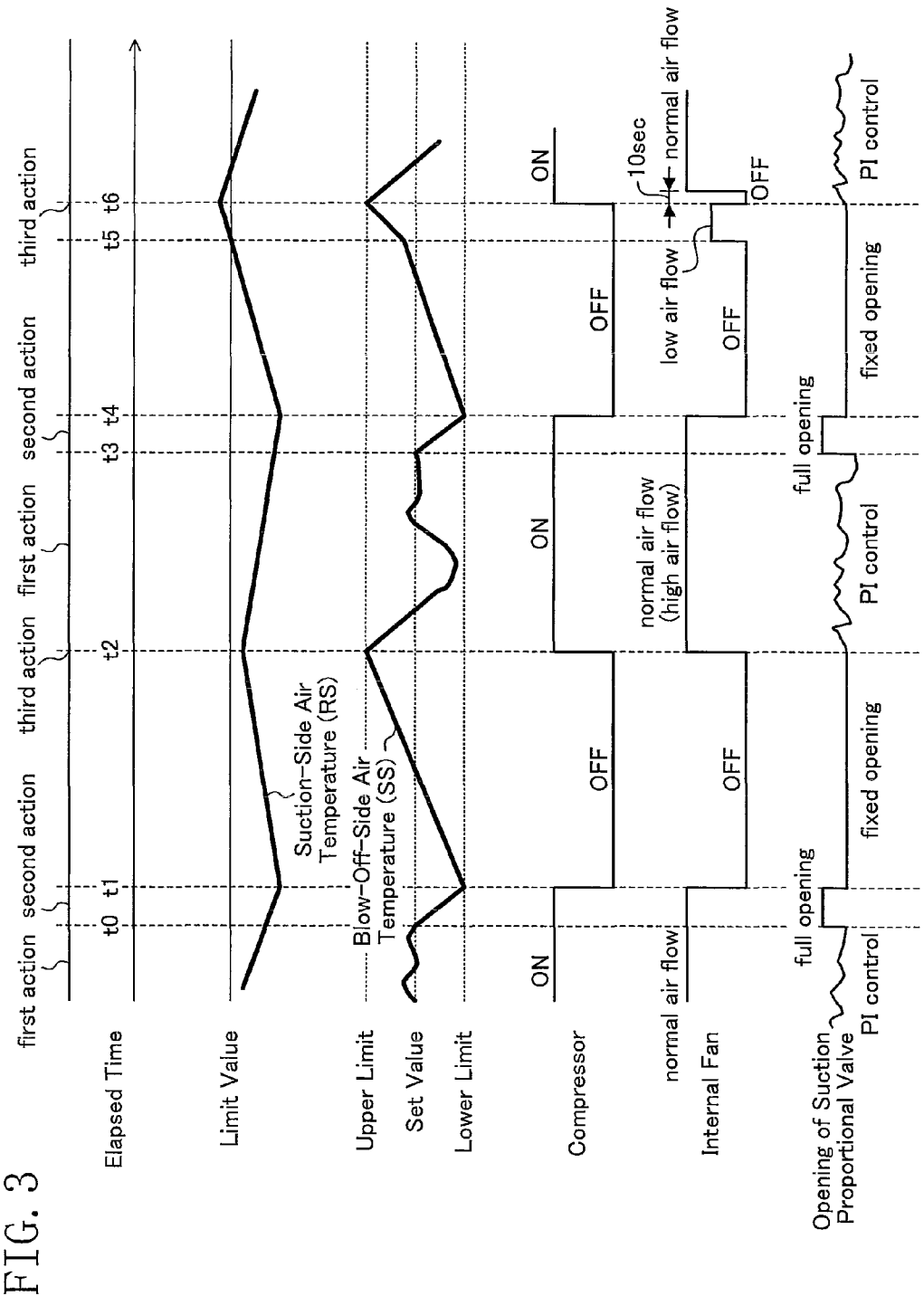
FIG. 3 is a time chart illustrating an energy saving operation mode in Embodiment 1.

Next, a description is given of the energy saving operation mode of the refrigeration system (1). In the energy saving operation mode, the controller repeats control actions from the first to third as shown in FIG. 3. Note that the basic refrigerant flow in the refrigeration system (1) in the energy saving operation mode is the same as in the normal operation mode.

In the first action, the compressor (11) is driven and the internal fan (16) is driven at a normal air flow rate. Furthermore, in the first action, the controller controls the cooling capacity of the evaporator (14) to keep the blow-off-side air temperature at the set value.

Specifically, in the first action, the opening of the suction proportional valve (35) is regulated by PI control based on the blow-off-side air temperature and its set value. As a result, the refrigerant circulation amount in the refrigerant circuit (10) is regulated according to the opening of the suction proportional valve (35) and the cooling capacity of the evaporator (14) is controlled.

When the cooling capacity of the evaporator (14) is controlled while the opening of the suction proportional valve (35) is throttled in the above manner, refrigerant is likely to become wet over the entire area of the evaporator (14). If the cooling capacity of the evaporator were controlled by regulating the opening of the expansion valve (13) on the inflow side of the evaporator, refrigerant flowing through the evaporator would be on the dry side and likely to cause temperature variations from inflow end to outflow end of the evaporator. On the other hand, when the cooling capacity of the evaporator (14) is controlled while the opening of the suction proportional valve (35) is throttled, this uniformizes the temperature distribution of refrigerant from inflow end to outflow end of the evaporator (14). As a result, the air in the cold storage can be relatively uniformly cooled, thereby enhancing the controllability over the internal cold storage temperature through the evaporator (14).

When the blow-off-side air temperature is kept at the set value for a predetermined period of time after reaching it by the first action, the second action is started (at Time t0 in FIG. 3). At the end of the first action, a certain amount of cold heat has been accumulated in the container and stored goods in the container.

In the second action, first, the suction proportional valve (35) is set to, for example, a fully-open position while the compressor (11) and the internal fan (16) are still continuously driven. Thus, the refrigerant circulation amount in the refrigerant circuit (10) increases and the cooling capacity of the evaporator (14) increases. As a result, the blow-off-side air temperature gradually decreases from the set value. Then, when the blow-off-side air temperature reaches the lower limit temperature of the desired temperature range, the compressor (11) and the internal fan (16) are stopped and the suction proportional valve (35) is set to a fixed opening smaller than the full opening (at Time t1 in FIG. 3). With this, the second action terminates. Through the second action, the amount of cold heat accumulated in the stored goods and the like further increases.

As a result of the second action, the refrigeration cycle in the refrigerant circuit (10) is stopped, so that the evaporator (14) substantially stops cooling the interior of the cold storage. Thus, although the internal cold storage temperature (i.e., the blow-off-side air temperature and the suction-side air temperature) gradually rises, its rise is hindered by the cold heat accumulated in the stored goods and the like. In other words, the blow-off-side air temperature and the suction-side air temperature slowly rise. Furthermore, since the internal fan (16) is stopped, there is no heat produced by driving the internal fan (16). This further hinders the rise in the blow-off-side air temperature. Then, when the blow-off-side air temperature rises to the upper limit temperature of the desired temperature range, the third action is started (at Time t2 in FIG. 3). Note that at this time the suction-side air temperature has not reached the limit value. Furthermore, throughout the period of time from the end of the second action (Time t1) to the start of the third action (Time t2), the suction proportional valve (35) is held at the fixed opening.

In the third action, the above-described first action is restarted. Specifically, the compressor (11) and the internal fan (16) are activated again, and the opening of the suction proportional valve (35) is regulated by PI control based on the blow-off-side air temperature and its set value. Thus, the refrigerant circulation amount in the refrigerant circuit (10) is regulated and the cooling capacity of the evaporator (14) is controlled. Then, when the blow-off-side air temperature is kept at the set value for a predetermined period of time after reaching it by the restart of the first action, the above-described second action is restarted (at Time t3 in FIG. 3). Thus, when the blow-off-side air temperature lowers to the lower limit temperature of the desired temperature range, the compressor (11) and the internal fan (16) are stopped and the suction proportional valve (35) is set to the fixed opening (at Time t4 in FIG. 3).

After the end of this second action, the rise in the internal cold storage temperature is hindered by the cold heat accumulated in the stored goods and the like in the above-described manner. Then, when the suction-side air temperature rises to the predetermined limit value, the controller activates the internal fan (16). At this time, the internal fan (16) is driven at a lower air flow rate than that in the first action (Time t5 in FIG. 3). When the internal fan (16) is driven, the air in a region of the cold storage near to the air inlet, which is the highest temperature region in the cold storage, is sucked in and blown off into a region of the cold storage near to the air outlet, which is the lowest temperature region. Thus, the air in the cold storage is agitated to even out the internal cold storage temperature. Hence, an accurate blow-off-side air temperature, i.e., an accurate highest temperature in the cold storage, can be detected. In other words, this control is intended to accurately detect the highest internal cold storage temperature by assuming, when the suction-side air temperature lying within a relatively high temperature range reaches the limit value, that the entire internal cold storage temperature has reached a relatively high temperature, and driving the internal fan (16) to agitate the air in the cold storage.

Then, when the blow-off-side air temperature rises to the upper limit temperature of the desired temperature range, the third action is carried out again to restart the first action (at Time t6 in FIG. 3). Specifically, the compressor (11) and the internal fan (16) are driven. In this case, when the blow-off-side air temperature reaches the upper limit temperature of the desired temperature range, the internal fan (16) is once stopped. Then, when a predetermined period of time has passed (after ten seconds in this embodiment), the internal fan (16) is activated again at the normal air flow rate. Furthermore, the opening of the suction proportional valve (35) is regulated by the above-described PI control. When the first action is restarted, the interior of the cold storage is cooled and the blow-off-side air temperature gradually approaches the set value. The reason why the internal fan (16) is once stopped and then activated again is to reduce an abrupt torque variation of the internal fan (16) in changing the rotational speed from low to normal (high) air flow rate.

Effects of Embodiment

As described above, this embodiment is capable of operating in an energy saving operation mode in which the compressor (11) and the internal fan (16) are intermittently driven. Therefore, for the stop period of time of the compressor (11) and the internal fan (16), the refrigerant circuit (10) does not operate in a refrigeration cycle but the rise in the internal cold storage temperature can be hindered (slowed down) by utilizing cold heat accumulated in stored goods and the like. In addition, since the internal fan (16) is also stopped, this prevents heat production due to driving of the internal fan (16) and thereby further hinders the rise in the internal cold storage temperature. Since thus the stop period of time of the compressor (11) and the internal fan (16) can be extended by utilizing cold heat accumulated in stored goods and the like, this significantly reduces the operating power for the compressor (11) and the internal fan (16). As a result, the energy saving performance of the refrigeration system (1) can be significantly enhanced.

Particularly in the energy saving operation mode in this embodiment, the blow-off-side air temperature is once lowered to the lower limit temperature by the second action and the compressor (11) and the internal fan (16) are then stopped. Therefore, the amount of cold heat accumulated in the stored goods and the like can be increased. This further extends the stop period of time of the compressor (11) and the internal fan (16) and thereby further enhances the energy saving performance.

Furthermore, in the energy saving operation mode, when the suction-side air temperature rises to the limit value during stop of the compressor (11) and the internal fan (16), the internal fan (16) is activated at a lower air flow rate than in the first action. Thus, the air in the cold storage can be agitated to even out the internal cold storage temperature. Therefore, the highest internal cold storage temperature, i.e., the blow-off-side air temperature, can be accurately detected to accurately determine the start timing of the third action. As a result, the reliability of control over the internal cold storage temperature is prevented from being spoiled. In addition, since in this control the internal fan (16) is driven at a lower air flow rate than in the first action, the amount of heat produced by the internal fan (16) can be reduced. Hence, the reliability of control over the internal cold storage temperature can be increased without reducing the period of time from the second action to the third action so much.

Moreover, in the energy saving operation mode, the capacity of the evaporator (14) and the on/off switching of the compressor (11) are controlled so that the blow-off-side air temperature changes within the range from the lower limit temperature, i.e., the lower limit of the desired range of blow-off-side air temperatures, to the upper limit temperature, i.e., the upper limit of the desired temperature range. Therefore, it can be avoided that in the energy saving operation mode, the internal cold storage temperature deviates from the allowable temperature range. This enhances the reliability of the refrigeration system (1).

Furthermore, in this embodiment, the cooling capacity of the evaporator (14) is controlled by regulating the opening of the suction proportional valve (35). When the cooling capacity of the evaporator (14) is thus controlled while the opening of the suction proportional valve (35) is regulated, the refrigerant becomes on the wet side over the entire area of the evaporator (14). Therefore, the air in the cold storage can be relatively uniformly cooled by the evaporator (14). As a result, in the first action of the energy saving operation mode, the blow-off-side air temperature can be promptly and surely brought close to the set value. Moreover, since during the second action the compressor (11) and the internal fan (16) can be surely stopped at the time when the blow-off-side air temperature reaches the lower limit, it can be avoided that during the subsequent third action the internal cold storage temperature falls below the lower limit.

Furthermore, in the second action, even if the cooling capacity of the evaporator (14) is increased by regulating the opening of the suction proportional valve (35), the operating capacity of the compressor (11) does not change. Therefore, in the second action, the cooling capacity of the evaporator (14) can be increased without increasing the operating power of the compressor (11). Hence, the energy saving performance of the refrigeration system (1) can be further enhanced.

Modifications of Embodiment 1

Modifications of Embodiment 1 will be described below.

Modification 1

In Modification 1, the limit value of the suction-side air temperature in the energy saving operation mode in Embodiment 1 is set based on the suction-side air temperature at the end of the first action.

Figure 4:
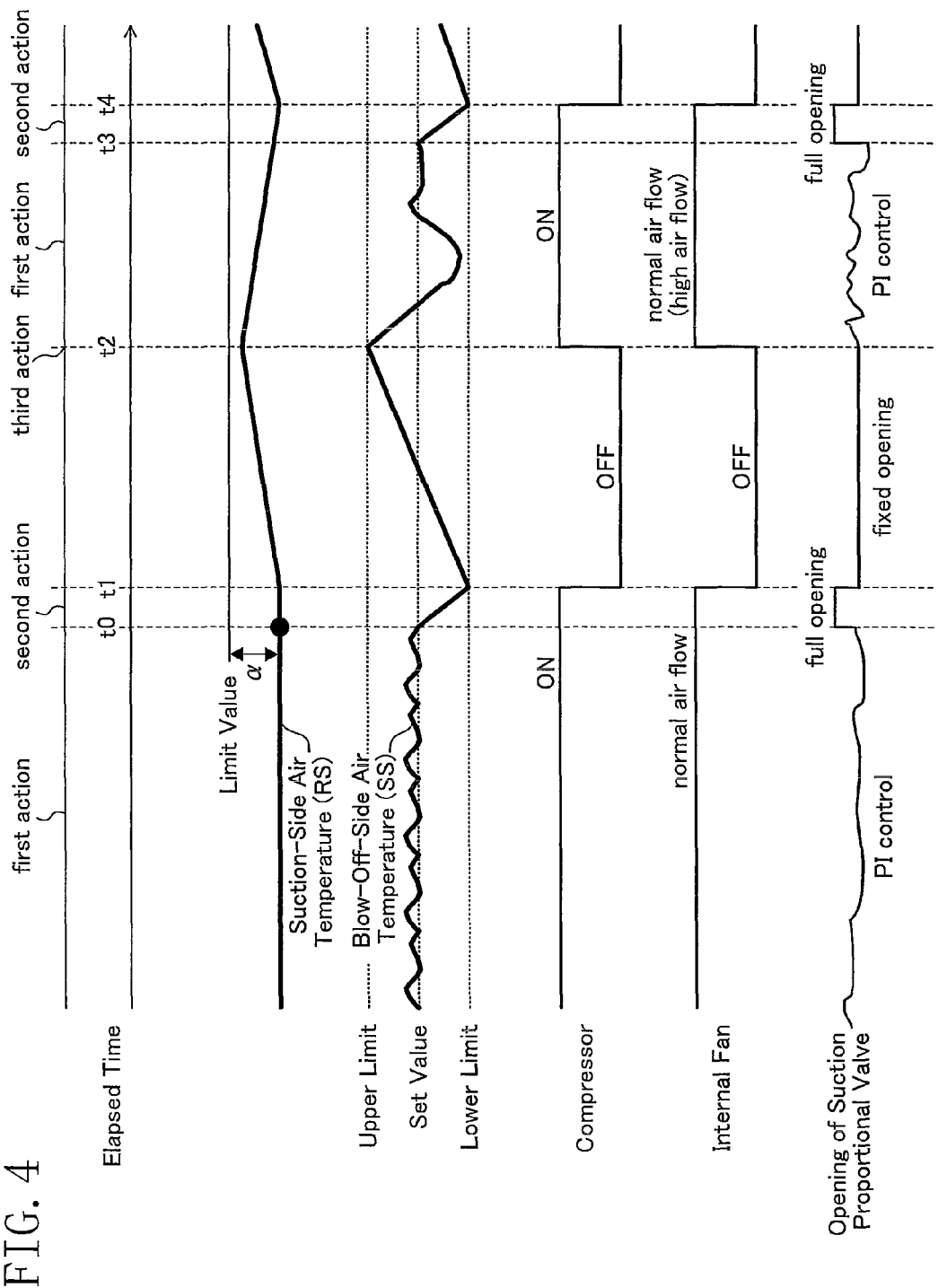
FIG. 4 is a time chart illustrating an energy saving operation mode in Modification 1 of Embodiment 1.

As shown in FIG. 4, in the energy saving operation mode, the first action is carried out in the above-described manner. When, by the first action, the blow-off-side air temperature is kept at the set value for a predetermined period of time and the suction-side air temperature is kept at a constant value lower than the limit value, the above-described second action is started (at Time t0 in FIG. 4).

In this case, the controller sets the limit value of the suction-side air temperature at an $\alpha°$ C. higher value than the suction-side air temperature at the end of the first action. Specifically, in Modification 1, the limit value of the suction-side air temperature is not set prior to the operation but set based on the suction-side air temperature meeting the actual cooling load obtained by the first action. Thus, the limit value of the suction-side air temperature can be set at an appropriate value to the cooling load. Therefore, the activation timing of the internal fan (16) can be appropriately determined within the period of time from the second action to the start of the third action, which enhances the controllability over the internal cold storage temperature. After the second action, like Embodiment 1, the third action, the first action and the second action are carried out.

In Modification 1, upon every start of the second action during the energy saving operation, the limit value of the suction-side air temperature may be set based on the suction-side air temperature at the end of the previous first action. In other words, upon every start of the second action, the limit value of the suction-side air temperature may be corrected. This provides a more appropriate limit value of the suction-side air temperature to the cooling load and thereby further enhances the controllability.

Furthermore, although in Modification 1 the limit value of the suction-side air temperature is set based on the suction-side air temperature at the end of the first action, a normal operation mode may be carried out prior to the energy saving operation mode so that the limit value is set based on the suction-side air temperature at the end of the normal operation mode.

Modification 2

In Modification 2, the condition of activation of the internal fan (16) after the second action is different from that in Embodiment 1. Specifically, although in the energy saving operation mode in Embodiment 1 the internal fan (16) is activated when the suction-side air temperature reaches the limit value, the time when the internal fan (16) is activated is changed in this modification.

Figure 5:
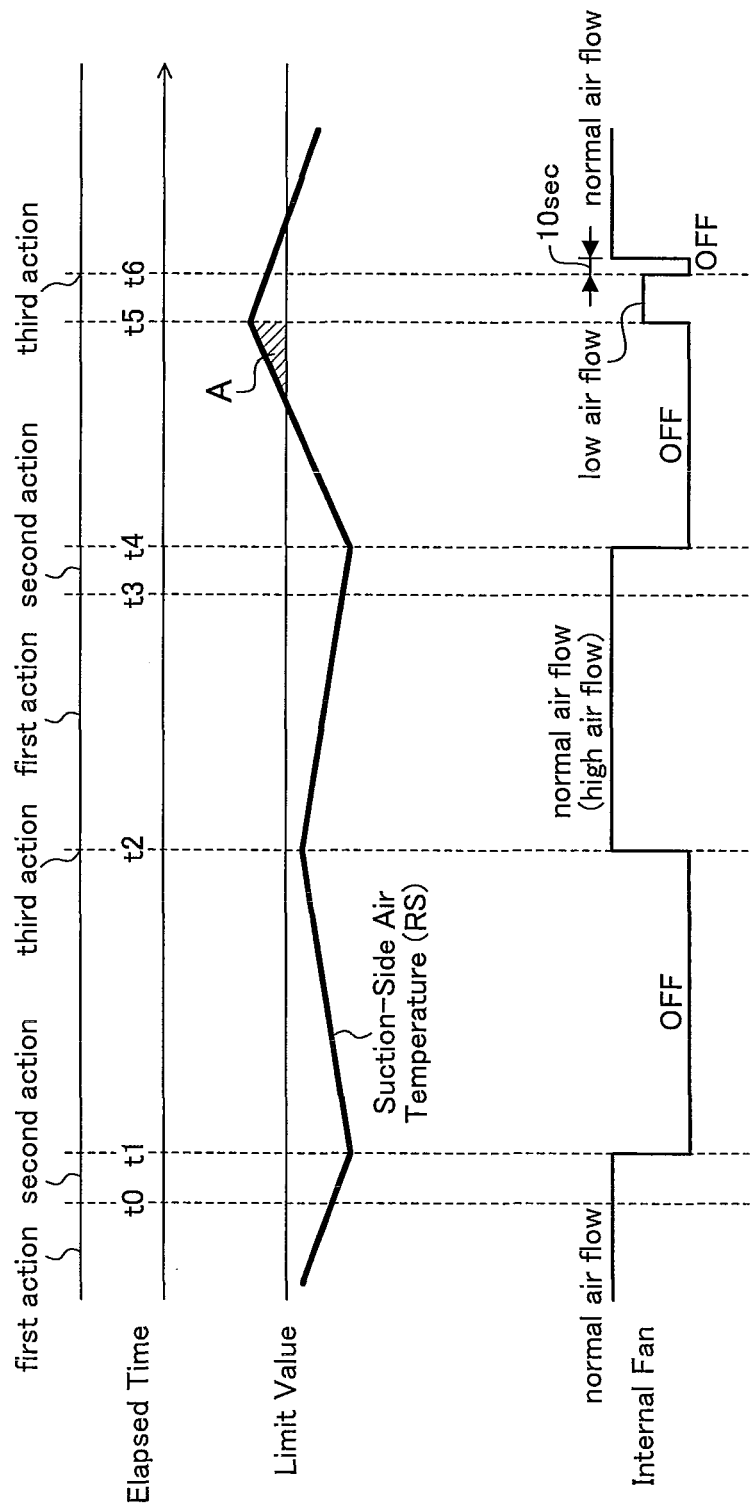
FIG. 5 is a time chart illustrating an energy saving operation mode in Modification 2 of Embodiment 1.

More specifically, as shown in FIG. 5, even at the time when the suction-side air temperature reaches the limit value after the second action, the internal fan (16) is not yet activated. Instead of this, when the suction-side air temperature further rises and the area defined by the suction-side air temperature and the limit value (Region A shown in FIG. 5) reaches a predetermined value, the internal fan (16) is activated at a low air flow rate. To be more specific, for example; in every one second after the suction-side air temperature reaches the limit value, the temperature difference between the suction-side air temperature and the limit value is detected and the sum of the temperature differences up to that point is integrated. When the integrated sum reaches a predetermined value (e.g., 10), the internal fan (16) is activated. According to this control, it can be detected that the suction-side air temperature surely reaches the limit value and is rising. Therefore, the activation timing of the internal fan (16) can be appropriately determined.

In the above-described control in this modification, the predetermined value of the integrated sum may be reduced according to the operating period of time of the energy saving operation mode. Specifically, let us assume that the predetermined value of the integrated sum is set at an initial value of "10". For example, when an hour of operating period of time of the energy saving operation mode has passed, the predetermined value is changed to "9". Then, when another hour of operating period of time has passed, the predetermined value is changed to "8". After this, the predetermined value of the integrated sum is likewise reduced as the operating period of time increases. Therefore, although, with increasing operating period of time, the amount of cold heat accumulated in the stored goods and the like gradually decreases and the internal cold storage temperature is more likely to increase, the rise in the internal cold storage temperature can be promptly detected.

Modification 3

In Modification 3, although not shown, the limit value of the suction-side air temperature in the energy saving operation mode in Embodiment 1 is reduced in every predetermined operating period of time. Specifically, in the energy saving operation mode, the limit value of the suction-side air temperature is reduced by a fixed amount, for example, in every hour of operating period of time. Thus, like Modification 2, even if a long operating period of time has passed and the amount of cold heat accumulated in the stored goods and the like decreases, the rise in the internal cold storage temperature after the second action can be promptly detected.

Modification 4

Figure 6:
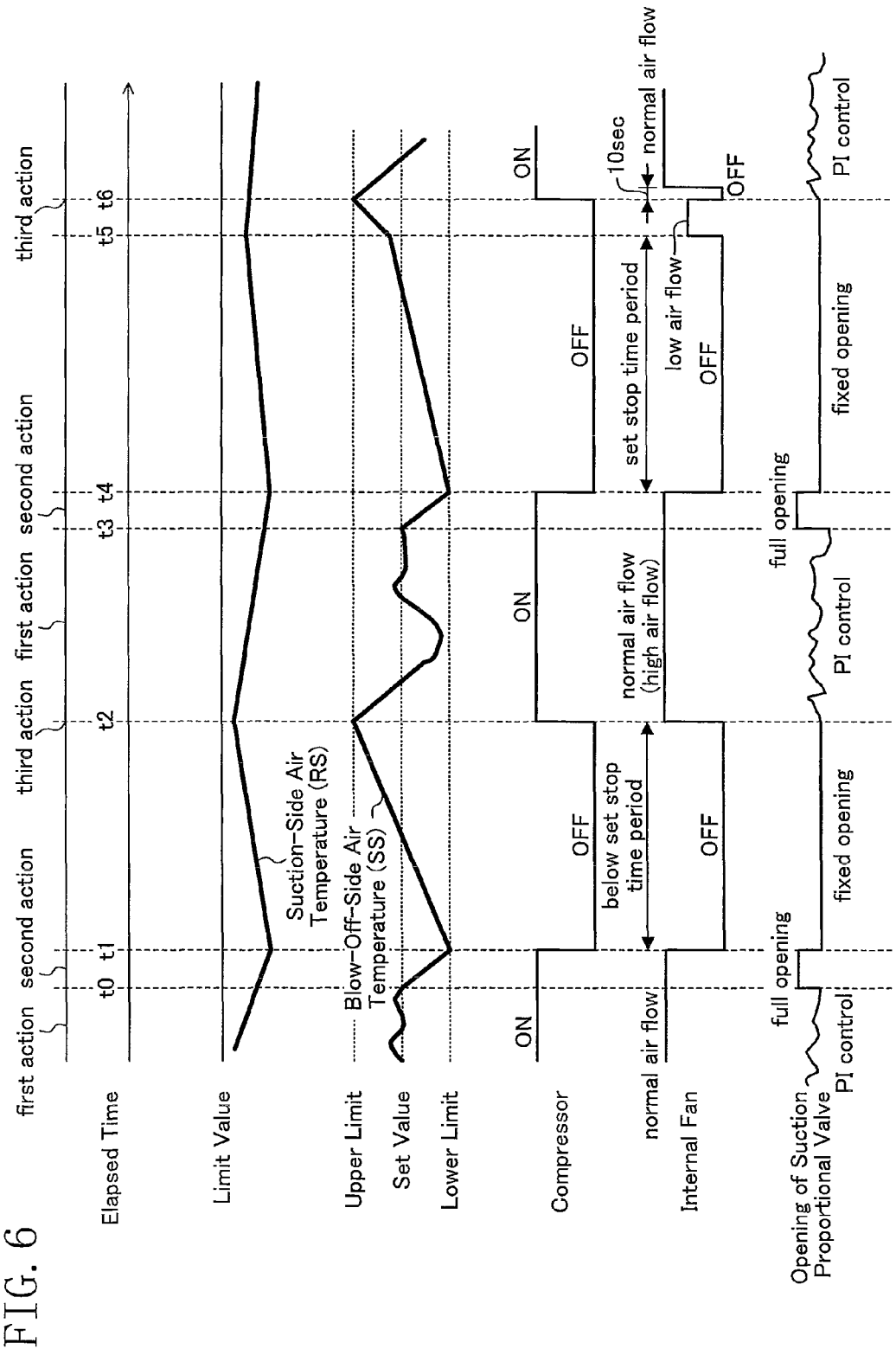
FIG. 6 is a time chart illustrating an energy saving operation mode in Modification 4 of Embodiment 1.

In Modification 4, as shown in FIG. 6, the condition of activation of the internal fan (16) after the second action of the energy saving operation mode is different from that in Embodiment 1.

Specifically, in the energy saving operation mode in this modification, the controller activates the internal fan (16) when a predetermined period of time (hereinafter, referred to as a set stop period of time) has passed since the compressor (11) and the internal fan (16) were stopped by the second action. In other words, in this modification, the stop period of time of the internal fan (16) due to the second action is set in advance. For example, the set stop period of time is set at such a period of time as it takes for the suction-side air temperature to reach the limit value.

In this case, in the energy saving operation mode, as a result of the second action, the compressor (11) and the internal fan (16) are stopped and the suction proportional valve (35) is held at a fixed opening. Thus, the blow-off-side air temperature and the suction-side air temperature gradually rise. Then, when the set stop period of time has passed since the stop of the internal fan (16), the internal fan (16) is activated at a low air flow rate. Thus, the air in the cold storage is agitated to even out the internal cold storage temperature. Thereafter, when the blow-off-side air temperature rises to the upper limit temperature of the desired temperature range, the compressor (11) is restarted and the internal fan (16) is once stopped and then restarted. The opening of the suction proportional valve (35) is regulated by the PI control. In other words, in this modification, when the set stop period of time has passed, the internal fan (16) is forcedly activated at a low air flow rate regardless of the suction-side air temperature. This eliminates the need for any operation for setting the limit value of the suction-side air temperature and any operation for detecting the suction-side air temperature, thereby simplifying the control structure.

Modification 5

In Modification 5, although not shown, the action of control over the internal fan (16) after the second action of the energy saving operation mode is different from that in Embodiment 1. Specifically, in this modification, only the internal fan (16) is intermittently driven after the second action. More specifically, like Embodiment 1, the compressor (11) and the internal fan (16) are stopped by the second action. Then, when a predetermined period of time (e.g., five minutes) has passed since the stop of the internal fan (16), the internal fan (16) is driven only for a fixed period of time (e.g., ten seconds). When the internal fan (16) is driven for the fixed period of time, it is stopped again. Then, when the predetermined period of time (five minutes) has passed, the internal fan (16) is activated again. Meanwhile, when the blow-off-side air temperature reaches the upper limit temperature of the desired temperature range during the above intermittent operation, the third action is carried out.

Since thus the internal fan (16) is intermittently operated, the internal cold storage temperature can be relatively evened out over the stop period of time of the compressor (11). Therefore, the highest internal cold storage temperature can be accurately detected even during the stop of the compressor (11). As a result, the start timing of the third action can be appropriately determined. Furthermore, since the internal fan (16) is intermittently driven, the amount of heat produced by the internal fan (16) can be reduced as compared with the case where the internal fan (16) is continuously driven. Therefore, the heat from the internal fan (16) does not contribute to the rise in the internal cold storage temperature so much, which extends the period of time from the second action to the start of the third action and thereby enhances the energy saving performance.

Modification 6

Figure 7:
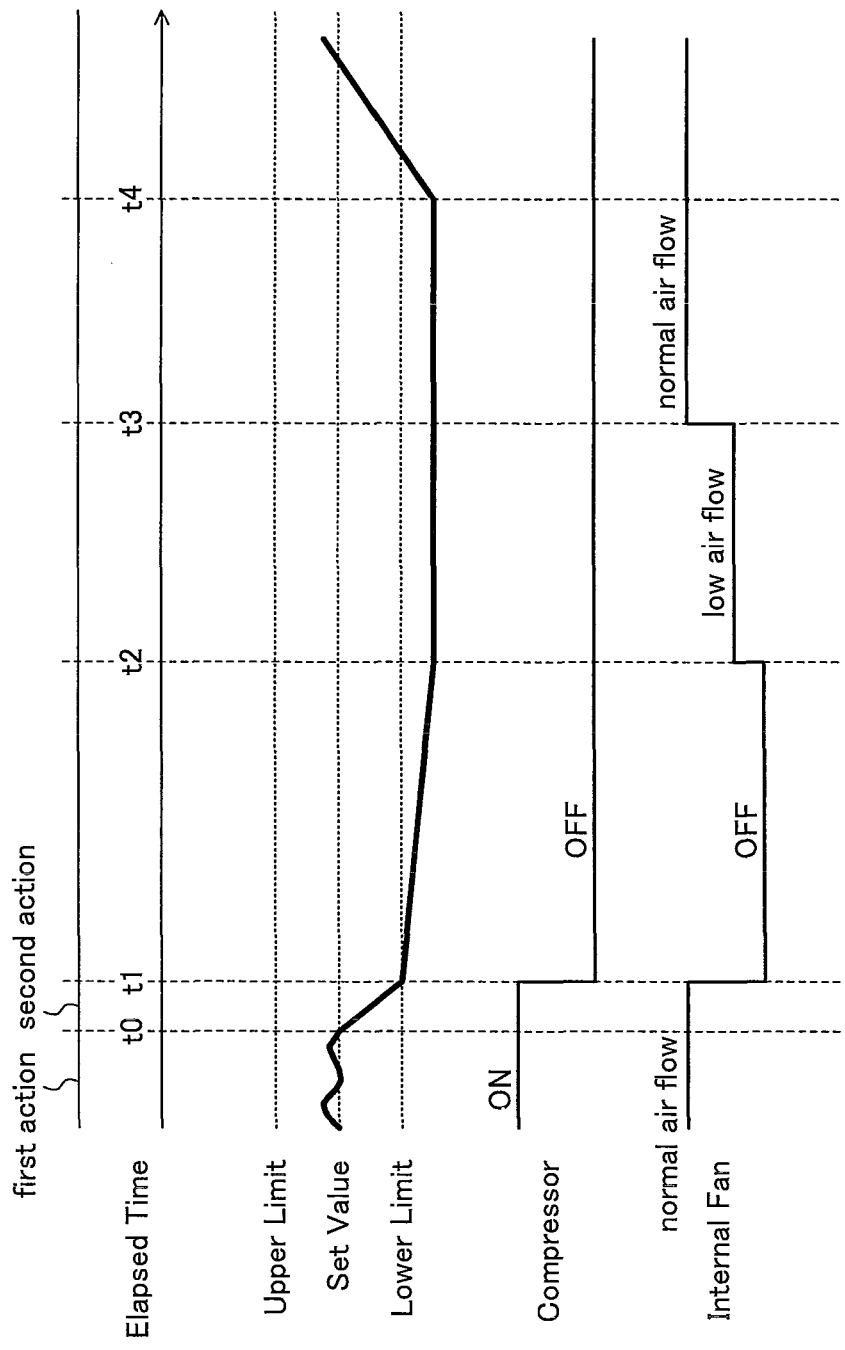
FIG. 7 is a time chart illustrating an energy saving operation mode in Modification 6 of Embodiment 1.

In Modification 6, as shown in FIG. 7, the action of control over the internal fan (16) after the second action of the energy saving operation mode is different from that in Embodiment 1. Specifically, although in Embodiment 1 the internal fan (16) is activated when the suction-side air temperature reaches the limit value, the internal fan (16) is controlled based on changes in blow-off-side air temperature in this modification.

More specifically, in the energy saving operation mode, the blow-off-side air temperature is lowered to the lower limit temperature of the desired temperature range by the second action (at Time t1 in FIG. 7). Thus, the compressor (11) and the internal fan (16) are stopped and the suction proportional valve (35) is held at a fixed opening.

After the stop of the compressor (11) and the internal fan (16), when the blow-off-side air temperature is further lowered to a predetermined value below the lower limit temperature of the desired temperature range for any reason, the controller activates the internal fan (16) at a low air flow rate (at Time t2 in FIG. 7). Thus, the air in the cold storage is agitated to even out the internal cold storage temperature, while the internal fan (16) produces heat. These homogenization of the internal cold storage temperature and heat production of the internal fan (16) prevent decrease in the internal cold storage temperature (blow-off-side air temperature). Thereafter, the blow-off-side air temperature remains below the lower limit temperature, for example, with little variation. Then, when in this state a predetermined period of time has passed, the controller changes the air flow rate of the internal fan (16) from low to normal (high) (at Time t3 in FIG. 7). Thus, the internal cold storage temperature is further evened out, while the amount of heat produced by the internal fan (16) increases. This increases the internal cold storage temperature (blow-off-side air temperature). In this modification, the blow-off-side air temperature changes little for a while after the change from low to normal air flow rate, and then rises (at Time t4 in FIG. 7).

If in this manner the blow-off-side air temperature after the second action excessively decreases below the lower limit temperature of the desired temperature range, the internal fan (16) is activated. Thus, the decrease in internal cold storage temperature can be prevented by the air agitation and heat production of the internal fan (16). Furthermore, if it takes a long time to raise the internal cold storage temperature, the air flow rate of the internal fan (16) is stepwise increased to boost the air agitation and heat production, whereby the internal cold storage temperature can be surely raised to the desired temperature range. Thus, the quality of the stored goods can be maintained Thereafter, when the blow-off-side air temperature rises and reaches the upper limit temperature of the desired temperature range, the third action is carried out like Embodiment 1.

Embodiment 2

Figure 8:
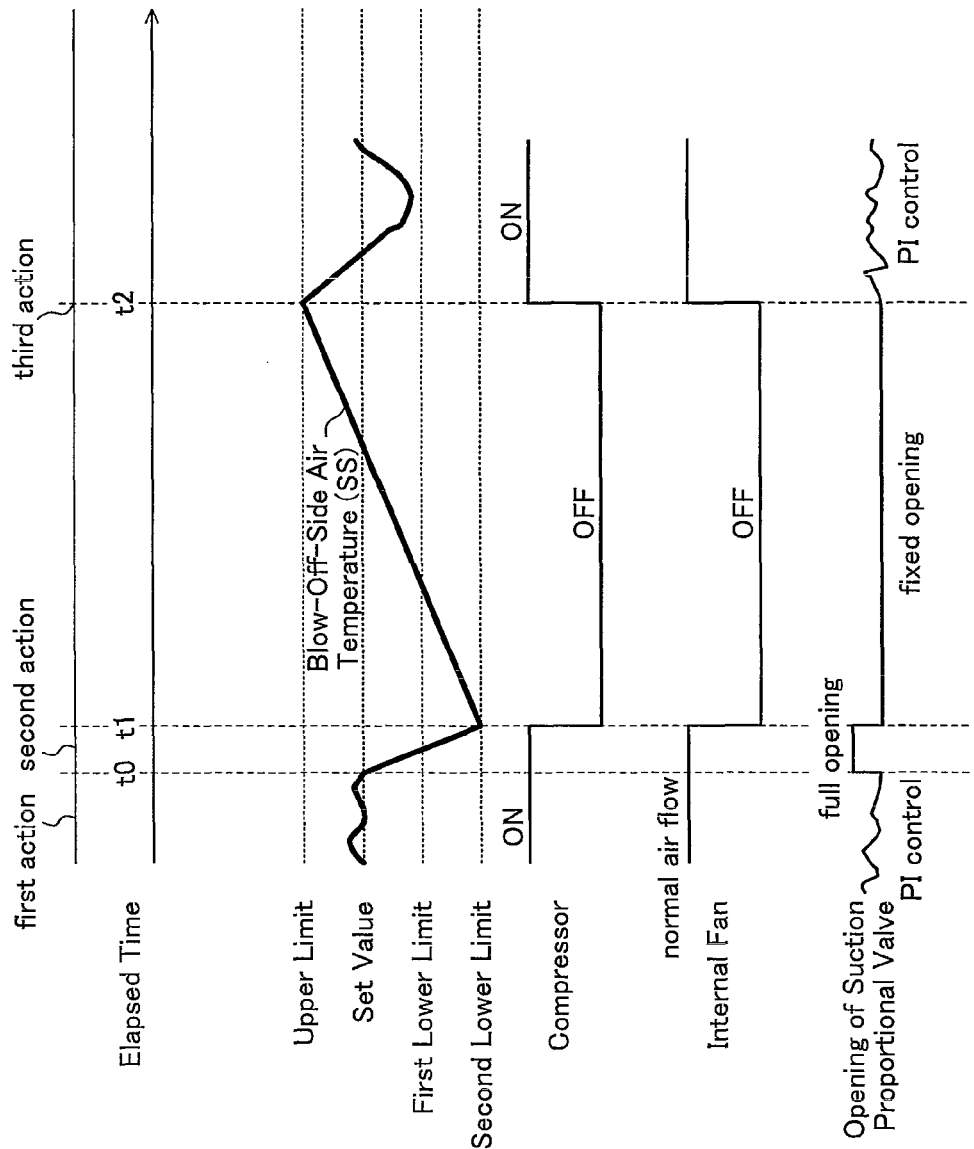
FIG. 8 is a time chart illustrating an energy saving operation mode in Embodiment 2.

A description is given of Embodiment 2 of the present invention. As shown in FIG. 8, the refrigeration system (1) according to this embodiment sets different upper limit values of the blow-off-side air temperature for the normal operation mode and the energy saving operation mode in Embodiment 1. Here, a description is given only of different points from Embodiment 1.

Specifically, in the normal operation mode in this embodiment, the lower limit of the desired range of blow-off-side air temperatures is set at a first lower limit temperature. On the other hand, in the energy saving operation mode, the lower limit of the desired range of blow-off-side air temperatures is set at a second lower limit temperature below the first lower limit temperature. In other words, in this embodiment, the lower limit of the desired range of blow-off-side air temperatures in the energy saving operation mode is lowered below that in the normal operation mode. The upper limits of the desired range of blow-off-side air temperatures in both the modes are set at equal values.

In this case, in the normal operation mode, like Embodiment 1, the controller regulates the opening of the suction proportional valve (35) to keep the blow-off-side air temperature at the set value. In the energy saving operation mode, like Embodiment 1, when the blow-off-side air temperature is kept at the set value by the first action, the second action is carried out. In the second action, the suction proportional valve (35) is set to a fully-open position, while the compressor (11) and the internal fan (16) are still continuously driven. As a result, the blow-off-side air temperature gradually decreases from the set value. Then, the blow-off-side air temperature reaches the first lower limit temperature of the desired temperature range. At this time, however, the compressor (11) and the internal fan (16) are not yet stopped. When the blow-off-side air temperature further decreases and reaches the second lower limit temperature of the desired temperature range, the compressor (11) and the internal fan (16) are stopped and the suction proportional valve (35) is set to a fixed opening smaller than the full opening (at Time t1 in FIG. 8). With this, the second action terminates. The later control actions are the same as in Embodiment 1.

Since in the energy saving operation mode in this embodiment the lower limit of the desired temperature range is lowered below that in the normal operation mode as described above, the capacity to cool the interior of the cold storage through the second action can be significantly increased. This significantly increases the amount of cold heat accumulated in the stored goods and the like. Therefore, after the second action, the rise in the internal cold storage temperature can be significantly hindered, which extends the stop period of time of the compressor (11) and the internal fan (16). In other words, according to the above control, the effect of accumulating cold heat in the stored goods and the like can be significantly increased. As a result, the energy saving performance can be enhanced.

Embodiment 3

A description is given of Embodiment 3 of the present invention. In a refrigeration system (1) according to this embodiment, although not shown, the set value of the blow-off-side air temperature in the energy saving operation mode in Embodiment 1 is lowered in every predetermined operating period of time. In this case, the upper and lower limit temperatures of the desired range of blow-off-side air temperatures are not changed. Here, a description is given only of different points from Embodiment 1.

Specifically, until a predetermined period of time (e.g., an hour) has passed since the start of operation in the energy saving operation mode, the set value of the blow-off-side air temperature is kept at an initial value. Then, when the predetermined operating period of time has passed since the start of operation, the controller lowers the set value of the blow-off-side air temperature from the initial value by a fixed amount (for example, 0.1° C.). Thus, in the first action, the opening of the suction proportional valve (35) is regulated to keep the blow-off-side air temperature at the lowered set value. Then, when the blow-off-side air temperature is kept at the lowered set value, the second action as in Embodiment 1 is carried out. In this manner, the set value of the blow-off-side air temperature is stepwise lowered in every predetermined period of time after the start of the energy saving operation.

If the set value of the blow-off-side air temperature is lowered in the above manner, this increases the capacity to cool the interior of the cold storage through the first action. Meanwhile, since in the energy saving operation mode the compressor (11) and the internal fan (16) are intermittently driven, the amount of cold heat accumulated in the stored goods and the like gradually decreases as the operating period of time increases. Therefore, the stop period of time of the compressor (11) and the internal fan (16) after the second action is gradually shortened. However, in this embodiment, since the capacity to cool the interior of the cold storage through the first action is increased with increasing operating period of time, this hinders the decrease in the amount of cold heat accumulated in the stored goods. In other words, even if the refrigeration system operates in the energy saving operation mode for a long time, a sufficient amount of cold heat accumulated in the stored goods and the like can be secured. Thus, in the energy saving operation mode, the effect of accumulating cold heat in the stored goods and the like can be exhibited for a long time. This hinders the stop period of time of the compressor (11) and the internal fan (16) from being shortened and thereby surely enhances the energy saving performance.

Embodiment 4

A description is given of Embodiment 4 of the present invention. In a refrigeration system (1) according to this embodiment, although not shown, the operating period of time of the first action in the energy saving operation mode in Embodiment 1 is forcedly extended in every predetermined operating period of time. Here, a description is given only of different points from Embodiment 1.

Specifically, in the energy saving operation mode in Embodiment 1, when the blow-off-side air temperature is kept at the set value by the first action, the second action is started. In other words, in Embodiment 1, the operating period of time of the first action is approximately fixed (e.g., two minutes). In contrast, in this embodiment, the operating period of time of the first action is increased by a fixed amount (e.g., one minute) in every predetermined period of time (e.g., one hour) after the start of the energy saving operation.

For example, in the energy saving operation mode in this embodiment, the operating period of time of the first action is set at an initial value of "two minutes". In this case, even if the blow-off-side air temperature is kept at the set value in the first action, the second action is not started until two minutes have passed since the start of the first action. Then, when two minutes have passed since the start of the first action, the second and third actions are carried out in this order. Thereafter, when the predetermined period of time (one hour) has passed since the start of the energy saving operation, the controller increases the operating period of time of the first action from the initial value of "two minutes" to "three minutes". Thus, even if the blow-off-side air temperature is kept at the set value in the later first action, the second action is not started until three minutes have passed since the start of the first action. In this manner, as the period of time of the energy saving operation increases, the operating period of time of the first action increases.

If the operating period of time of the first action increases in the above manner, the capacity to cool the interior of the cold storage through the first action is increased. In other words, the amount of cold heat accumulated in the stored goods and the like by the first action is increased. Therefore, although in the energy saving operation mode the amount of cold heat accumulated in the stored goods and the like is gradually decreased with increasing operating period of time by the intermittent operation of the compressor (11) and the internal fan (16), the decrease in the amount of cold heat accumulated can be hindered. Thus, even if the refrigeration system operates in the energy saving operation mode for a long time, a sufficient amount of cold heat accumulated in the stored goods and the like can be secured. Hence, in the energy saving operation mode, the effect of accumulating cold heat in the stored goods and the like can be exhibited for a long time, whereby the energy saving performance can be surely enhanced.

Although in the above embodiments and modifications the opening of the suction proportional valve (35) is set to the full opening upon the second action of the energy saving operation mode, the present invention is not limited to this setting. For example, upon the second action of the energy saving operation mode, the opening of the suction proportional valve (35) may be controlled to gradually increase from the opening at the end of the first action. Thus, the cooling capacity of the evaporator (14) can be gradually increased. This prevents the phenomenon of the blow-off-side air temperature falling below the lower limit temperature of the desired temperature range, i.e., a so-called overshoot. As a result, the quality of the stored goods can be surely maintained.

INDUSTRIAL APPLICABILITY

As can be seen from the above description, the present invention is useful as a method for energy saving operation of a refrigeration system with a cooling heat exchanger for cooling the interior of a cold storage.

The invention claimed is:

1. A refrigeration system comprising:
a refrigerant circuit including a compressor and a cooling heat exchanger both connected therein, the refrigerant circuit operating in a refrigeration cycle by circulating refrigerant therethrough; and
an internal fan for sucking in air from an air inlet provided in an upper part of an interior of a cold storage to allow the air to flow through the cooling heat exchanger and then blowing off the air into the cold storage from an air outlet provided in a lower part of the interior of the cold storage, wherein
the refrigeration system further comprises a capacity regulator for regulating the cooling capacity of the cooling heat exchanger to keep the blow-off-side air temperature in the cold storage at a set value,
the refrigeration system is configured to be capable of performing an energy saving operation including:
a first action in which the compressor and the internal fan are driven while the capacity regulator regulates the cooling capacity of the cooling heat exchanger;
a second action in which, when the blow-off-side air temperature is kept at the set value in the first action, the capacity regulator increases the cooling capacity of the cooling heat exchanger to lower the blow-off-side air temperature to a lower limit of a desired temperature range containing the set value, and then the compressor and the internal fan are stopped; and
a third action in which, when the blow-off-side air temperature after the second action rises to an upper limit of the desired temperature range, the first action is restarted,
the energy saving operation is configured so that when the suction-side air temperature in the air inlet of the interior of the cold storage after the second action rises to a predetermined limit value, the internal fan is activated at a lower air flow rate than in the first action, and
a predetermined period of time is defined, and the energy saving operation is configured so that the set value of the blow-off-side air temperature is lowered in every predetermined period of time.

2. The refrigeration system of claim 1, wherein the energy saving operation is configured so that the limit value of the suction-side air temperature is set at a fixed amount higher value than the suction-side air temperature at the end of the first action.

3. The refrigeration system of claim 1, wherein
the capacity regulator comprises a flow regulator valve, connected in the refrigerant circuit, for regulating the amount of flow of refrigerant sucked into the compressor, and
the energy saving operation is configured so that, upon the second action, the opening of the flow regulator valve is increased to increase the cooling capacity of the cooling heat exchanger.

4. A refrigeration system comprising:
a refrigerant circuit including a compressor and a cooling heat exchanger both connected therein, the refrigerant circuit operating in a refrigeration cycle by circulating refrigerant therethrough; and an internal fan for sucking in air from an air inlet provided in an upper part of an interior of a cold storage to allow the air to flow through the cooling heat exchanger and then blowing off the air into the cold storage from an air outlet provided in a lower part of the interior of the cold storage, wherein the refrigeration system further comprises a capacity regulator for regulating the cooling capacity of the cooling heat exchanger to keep the blow-off-side air temperature in the cold storage at a set value, the refrigeration system is configured to be capable of performing an energy saving operation including:

a first action in which the compressor and the internal fan are driven while the capacity regulator regulates the cooling capacity of the cooling heat exchanger;

a second action in which, when the blow-off-side air temperature is kept at the set value in the first action, the capacity regulator increases the cooling capacity of the cooling heat exchanger to lower the blow-off-side air temperature to a lower limit of a desired temperature range containing the set value, and then the compressor and the internal fan are stopped; and a third action in which, when the blow-off-side air temperature after the second action rises to an upper limit of the desired temperature range, the first action is restarted, the energy saving operation is configured so that when the suction-side air temperature in the air inlet of the interior of the cold storage after the second action rises to a predetermined limit value, the internal fan is activated at a lower air flow rate than in the first action, and a predetermined period of time is defined, and the energy saving operation is configured so that the operating period of time of the first action is forcedly extended in every predetermined period of time.

5. The refrigeration system of claim 4, wherein the energy saving operation is configured so that the limit value of the suction-side air temperature is set at a fixed amount higher value than the suction-side air temperature at the end of the first action.

6. The refrigeration system of claim 4, wherein the capacity regulator comprises a flow regulator valve, connected in the refrigerant circuit, for regulating the amount of flow of refrigerant sucked into the compressor, and the energy saving operation is configured so that, upon the second action, the opening of the flow regulator valve is increased to increase the cooling capacity of the cooling heat exchanger.

* * * * *